(12) United States Patent
Munday

(10) Patent No.: US 7,350,793 B2
(45) Date of Patent: Apr. 1, 2008

(54) VEHICLE SUSPENSION ROLL CONTROL SYSTEM

(75) Inventor: Raymond Andrew Munday, Dunsborough (AU)

(73) Assignee: Kinetic Pty Ltd., Dunsborough, WA (AU)

( * ) Notice: Subject to any disclaimer, the term of this patent is extended or adjusted under 35 U.S.C. 154(b) by 250 days.

(21) Appl. No.: 10/250,799

(22) PCT Filed: Jan. 10, 2002

(86) PCT No.: PCT/AU02/00028

§ 371 (c)(1),
(2), (4) Date: Dec. 3, 2003

(87) PCT Pub. No.: WO02/055327

PCT Pub. Date: Jul. 18, 2002

(65) Prior Publication Data

US 2004/0080124 A1    Apr. 29, 2004

(30) Foreign Application Priority Data

Jan. 10, 2001    (AU) .................................... PR 2499

(51) Int. Cl.
*B60G 21/06*    (2006.01)
(52) U.S. Cl. ..................... 280/124.106; 280/124.157
(58) Field of Classification Search ......... 280/124.106, 280/124.104, 124.16, 124.161, 124.157, 280/124.158, 124.159, 124.162
See application file for complete search history.

(56) References Cited

U.S. PATENT DOCUMENTS 1,037,730 A * 9/1912 Cowey .................... 267/64.17

(Continued)

FOREIGN PATENT DOCUMENTS

DE    11 12 907    8/1961

(Continued)

OTHER PUBLICATIONS

International Search Report—PCT/AU02/00028; ISA/Australian Patent Office; Feb. 5, 2002.

(Continued)

*Primary Examiner*—Ruth Ilan
*Assistant Examiner*—Barry Gooden, Jr.
(74) *Attorney, Agent, or Firm*—Harness, Dickey & Pierce, PLC

(57) ABSTRACT

A roll control system for a vehicle including: two double-acting rams (1, 2) at the first end of the vehicle and two single acting rams (3, 4) at the second of the vehicle; each double-acting ram (1, 2) including a first and a second fluid chamber (17, 18, 21, 22); each single-acting ram (3, 4) including a first fluid chamber (19, 20); a first lateral conduit (27) providing fluid communication between the first fluid chamber (17, 18) of the double-acting ram (1, 2) on a first side of the vehicle and the second fluid chamber (21, 22) of the double-acting ram (1, 2) on a second side of the vehicle, a first longitudinal conduit (29) providing fluid communication between the first fluid chamber (19, 20) of the single-acting ram (3, 4) on the first side of the vehicle and the first lateral conduit (27), forming a first fluid circuit; a second lateral conduit (28) providing fluid communication between the first fluid chamber (17, 18) of the double-acting ram (1, 2) on the second side of the vehicle and the second fluid chamber (17, 18) of the double-acting ram (1, 2) on the first side of the vehicle, a second longitudinal conduit (30) providing fluid communication between the first fluid chamber (19, 20) of the single-acting ram (3, 4) on the second side of the vehicle and the second lateral conduit (28), forming a second fluid circuit; the roll control system thereby providing a roll stiffness with substantially no warp stiffness.

14 Claims, 3 Drawing Sheets

U.S. PATENT DOCUMENTS

| | | | | |
|---|---|---|---|---|
| 3,262,522 | A | * | 7/1966 | Johnson et al. ............. 188/130 |
| 3,466,055 | A | * | 9/1969 | Keijzer .................... 280/5.507 |
| 3,820,812 | A | * | 6/1974 | Stubbs et al. ............ 280/5.506 |
| 4,478,431 | A | * | 10/1984 | Muller et al. ............ 280/6.159 |
| 5,624,105 | A | * | 4/1997 | Runkel .................... 267/64.15 |
| 5,794,966 | A | * | 8/1998 | MacLeod ................. 280/5.507 |
| 5,915,701 | A | * | 6/1999 | Heyring ................... 280/6.155 |
| 6,010,139 | A | * | 1/2000 | Heyring et al. ....... 280/124.104 |
| 6,519,517 | B1 | * | 2/2003 | Heyring et al. ............... 701/37 |
| 6,786,492 | B2 | * | 9/2004 | Brandenburger ......... 280/5.519 |
| 2001/0006285 | A1 | * | 7/2001 | Franzini ............. 280/124.106 |

FOREIGN PATENT DOCUMENTS

| | | |
|---|---|---|
| DE | 19 47 232 | 4/1971 |
| DE | 44 06 650 | 9/1995 |
| EP | 0 201 425 B1 | 3/1989 |
| EP | 0 818 332 A2 | 1/1998 |
| EP | 1 022 169 A2 | 7/2000 |
| FR | 1 256 864 | 3/1961 |
| GB | 1 488 254 | 10/1977 |
| JP | 08169224 A | 7/1996 |
| WO | WO 93/01063 | 1/1993 |
| WO | WO 98/36923 | 8/1998 |
| WO | WO 00/30879 | 6/2000 |
| WO | WO 00/61394 | 10/2000 |

OTHER PUBLICATIONS

Patent Abstracts of Japan, Publication No. 08169224 dated Feb. 7, 1996.

Office Action dated Apr. 2, 2007 for corresponding JP application No. 2002-556028 with translation.

* cited by examiner

VEHICLE SUSPENSION ROLL CONTROL SYSTEM

The present invention is generally directed to vehicle suspension systems, and in particular to vehicle suspension systems applicable for vehicles with uneven roll moment distributions.

The roll moment distribution, also known as "roll split" defines the ratio of roll stiffness provided at the front vehicle supports relative to the total roll stiffness of the vehicle.

The Applicant has developed vehicle suspension systems incorporating interconnected double acting rams as described in International Patent Application PCT/AU00/00311, International Publication Number WO 00/61393, now U.S. Pat. No. 6,519,517 and PCT/AU00/00312, International Publication Number WO 00/61394, now U.S. Pat. No. 6,761,371, details of which are incorporated herein by reference.

It has been found that the abovedescribed vehicle suspension systems do not operate as effectively when the vehicle upon which it is installed has a roll control arrangement with a substantially uneven roll moment distribution. In this situation very large bore rams are required typically for the front end, and very small bore rams are required for the other end of the vehicle to provide the correct front to rear balance of roll forces for the required roll moment distribution.

This has a number of disadvantages when the roll moment distribution is extreme, such as fluid mass acceleration effects from the large bore rams and high damping pressures from the small rams.

It is therefore an object of the present invention to provide a vehicle suspension system capable of effectively handling substantially uneven roll moment distributions.

With this in mind, there is provided a roll control system for a vehicle including:

a vehicle body and at least two surface engaging means towards a first end of the vehicle and at least two surface engaging means towards a second end of the vehicle;

the roll control system including two double-acting rams at the first end of the vehicle and two single acting rams at the second end of the vehicle;

each double-acting ram including a first and a second fluid chamber;

each single-acting ram including at least a first fluid chamber;

a first lateral conduit providing fluid communication between the first fluid chamber of the double-acting ram on a first side of the vehicle and the second fluid chamber of the double-acting ram on a second side of the vehicle, a first longitudinal conduit providing fluid communication between the first fluid chamber of the single-acting ram on the first side of the vehicle and the first lateral conduit, the first lateral conduit and first longitudinal conduit forming a first fluid circuit;

a second lateral conduit providing fluid communication between the first fluid chamber of the double-acting ram on the second side of the vehicle and the second fluid chamber of the double-acting ram on the first side of the vehicle, a second longitudinal conduit providing fluid communication between the first fluid chamber of the single-acting ram on the second side of the vehicle and the second lateral conduit, the second lateral conduit and second longitudinal conduit forming a second fluid circuit;

the roll control system thereby providing a roll stiffness with at least substantially no warp stiffness.

At least one accumulator may be provided on each of the first and second fluid circuits.

Each double-acting ram may include a barrel accommodating a piston fixed to a piston rod, the piston separating the interior of the barrel into said first and second chambers. The piston may include a seal to the barrel to substantially prevent transfer of fluid from the first chamber to the second chamber.

Each single acting ram may further include a piston fixed to the rod, the piston dividing the barrel into a first and a second fluid chamber. The piston may include holes through to permit fluid communication between the first and second fluid chambers. This can allow the ram to be used as a rebound stop, but it is still effectively a single acting ram with only a rod housed in a barrel forming a single fluid chamber.

Accumulator dampers may be provided between the accumulators and the first and second fluid circuits.

Damper valves may be provided to variably restrict the flow of fluid out of the first fluid chamber of each of the rams.

Damping valves may be provided to variably restrict the flow of fluid out of the second fluid chamber of each of the rams.

At least one additional pressure maintenance accumulator may be provided. The pressure maintenance accumulator may be connected to both the first and second fluid circuits through restrictors. Alternatively or additionally, the pressure maintenance accumulator may be connected to both the first and second fluid circuits through a valve which may be controlled by a mechanical or electronic device.

The roll control system according to the present invention can be readily adapted for vehicles having substantially uneven roll moment distributions because of the respective use of double-acting rams and single acting rams at or adjacent opposing ends of the vehicle.

The roll control system works by separating the heave and roll modes of the suspension at one end of the vehicle using double-acting rams. This allows for a higher roll stiffness than bounce stiffness due to the double-acting ram configuration of the roll control system at that end of the vehicle, since a major chamber of the double-acting ram on one side the vehicle is cross-connected to a minor chamber of the double-acting ram at the opposite side if the vehicle (preferably with an accumulator on each cross-connecting line to provide resilience). In heave, the annular area of the minor chamber of one ram subtracts from the whole piston face area of the major chamber of the opposing ram leaving only rod area resulting in a small displacement of fluid into or out of the accumulators. In roll, the annular area of the minor chamber of one ram and the whole piston face area of the major chamber of the opposing ram are additive, resulting in a much greater displacement of fluid into and out of the accumulators.

The major chambers of the double-acting rams at one end of the vehicle are connected to the single-acting rams at the opposite end of the vehicle. Therefore, in roll, the loads generated are related to the whole piston face and annular areas of the double-acting rams at one end of the vehicle and the rod areas at the other end of the vehicle, giving a large difference in load from one and to the other and a high roll moment distribution. In heave, the rod areas of the cylinders at both ends of the vehicle give low loads all round.

If the same double-acting ram configuration was used at both ends of the vehicle when the roll stiffness required is very different at each end, and the rams are interconnected as disclosed in the prior art, then the rams at one end of the vehicle end up with a very small bore. The rod size cannot be too small as it must prevent buckling when under damper loads, so the size of the annular area of the low roll stiffness rams is very small if the rams are double-acting, which means that to generate high damping forces required to control the wheels in rebound, the pressures are unacceptably high. Using a single acting ram at the rear allows for only rod area to be displaced in both heave and roll, which (when the roll loads required are small) gives a good balance of sizes in the system. The ram used is preferably of a two chamber type to give a decent annular chamber to control the rebound damping of the wheels, but with both chambers connected (preferably though damper valving) to make the ram single-acting.

In warp motions of the wheels relative to the body, the double-acting rams displace whole piston face and annular areas additively, so the matching rear displacement based on rod volume is then correspondingly large (based on the roll moment distribution, reversed front to rear, as for any suspension system). If the support springs and any auxiliary roll stiffness front and rear are not of the same roll moment distribution (reversed front to rear) as the roll control system, then the roll control system will build up pressure as it tries to match the warp of the vehicle to the roll moment distribution. Although the roll control system builds up pressure in one direction to try and roll the vehicle (against the support springs) to the correct position of its roll moment distribution, this is not a warp stiffness. The warp stiffness of the roll control system is practically zero.

Optionally, a fluid supply system 60 including a pump 61 as a source of pressurized fluid and valves 62, sensors 63 and electronics 64 may be provided to permit control of the roll angle of the vehicle. These may be used to control the pressure in the system and the roll angle of the vehicle by supplying and removing fluid from the first and second fluid circuits. Alternatively, the pump can just transfer fluid from one system directly into the other. Preferably, when the control of the roll angle of the vehicle is fast acting (ie what is usually referred to as active roll control), roll damping in the accumulators may be provided to damp the roll system resilience and improve the active system response characteristics. In particular, damper valves may be provided between the accumulators and the first and second circuits to thereby damp the roll system resilience and improve the active system response characteristics.

It will be convenient to further describe the invention with respect to the accompanying drawings which illustrate a preferred embodiment of the roll control system according to the present invention. Other embodiments of the invention are possible, and consequently, the particularity of the accompanying drawings is not to be understood as superceding the generality of the preceeding description of the invention.

Figure 1:
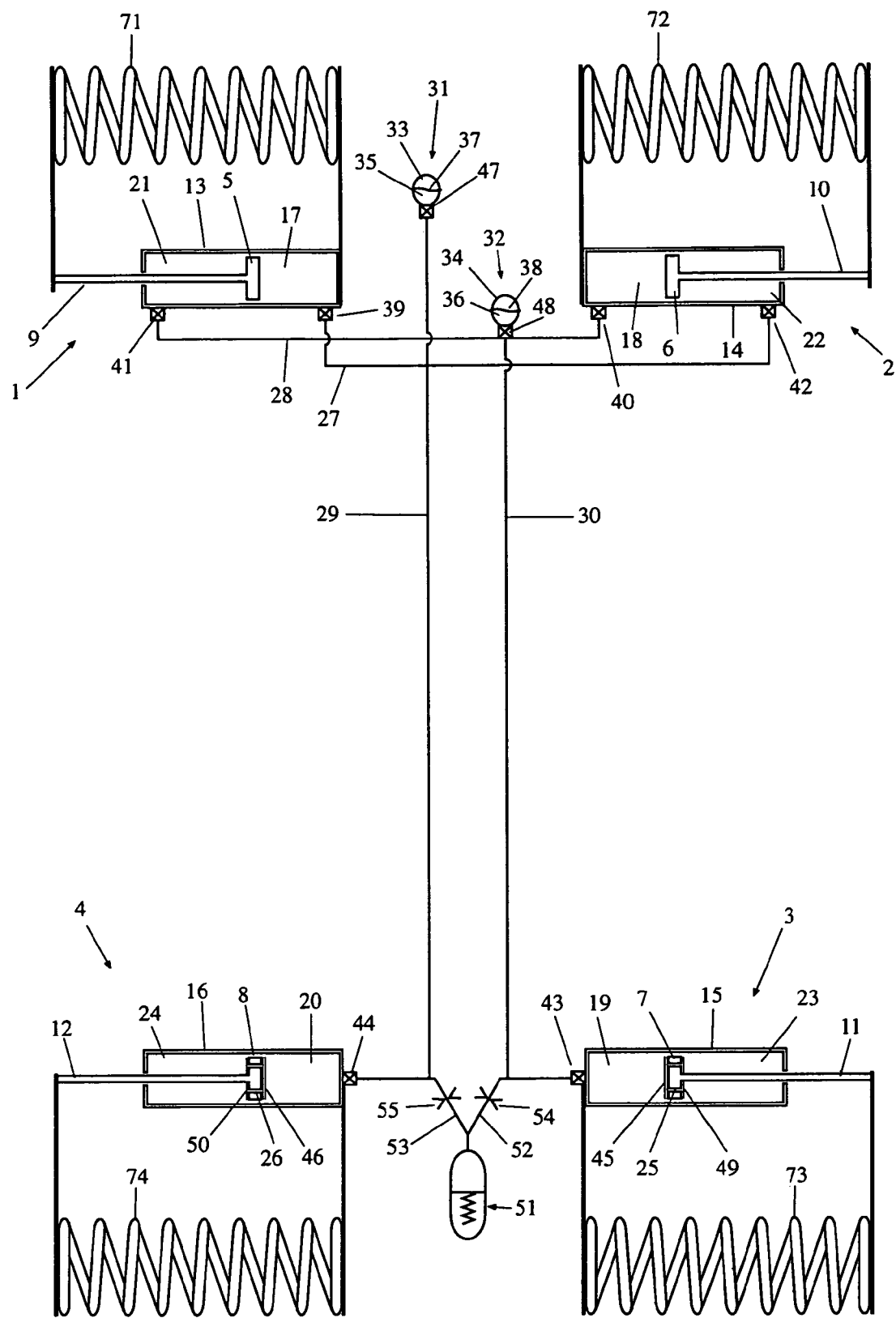
FIG. 1 is a schematic diagram of a roll control system according to the present invention.
Figure 2:
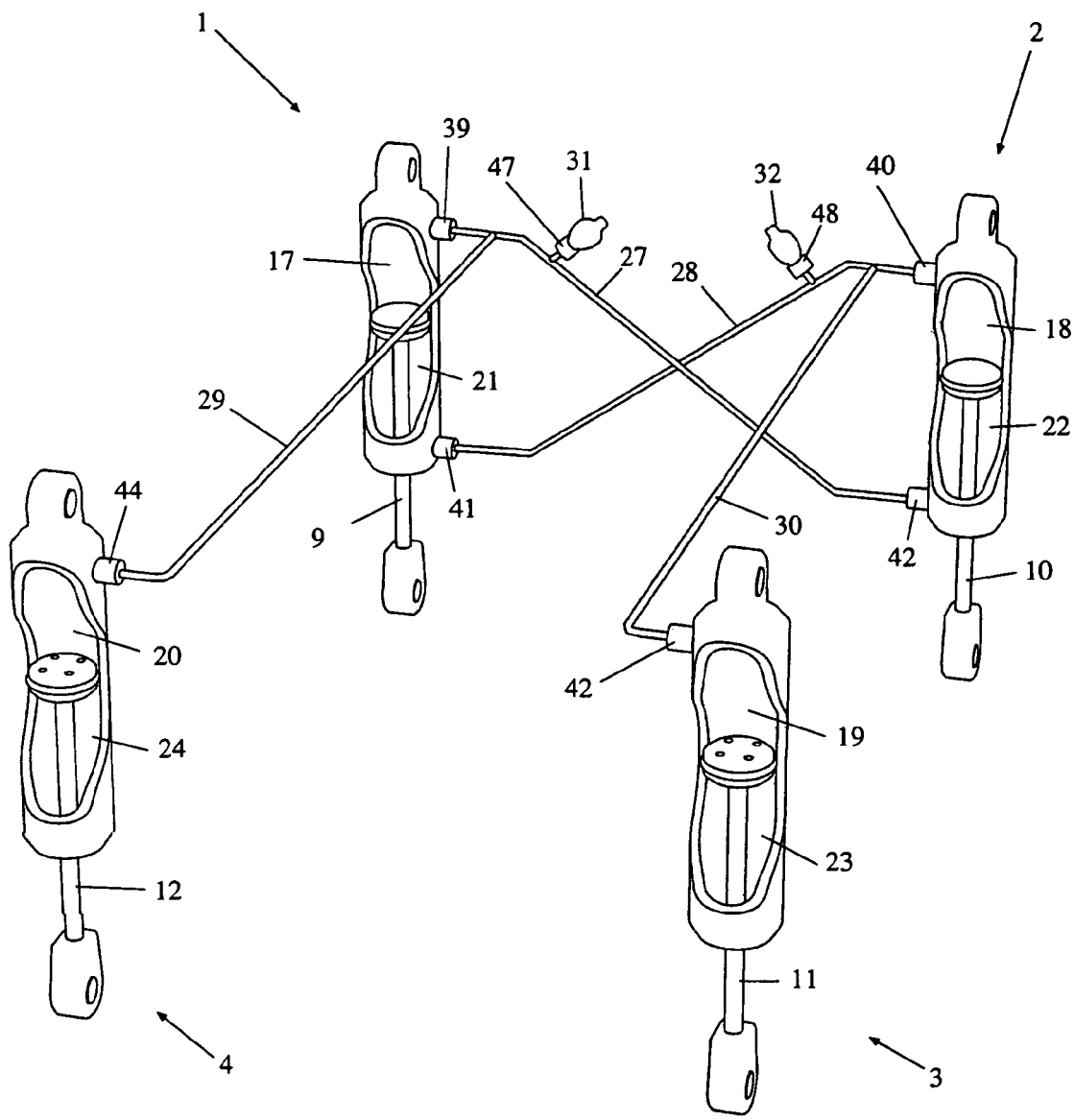
FIG. 2 is a cut-away view of the roll control system of FIG. 1.

Referring to the figures (in which corresponding parts have been allocated common reference numerals), the roll control system comprises two double acting rams at one end of the vehicle (one for each wheel) and two single acting rams at the other end of the vehicle (again one for each wheel). The double acting rams 1 and 2 are at the front of the vehicle, with the single acting rams 3 and 4 at the rear for all the following description, but it should be understood that the double acting rams may be at the rear, with the front rams being single acting, depending on the required roll moment distribution from the system. The roll control system provides little or no support for the vehicle. Ideally, the roll control system should not provide any vertical support of the vehicle. The vertical support for the vehicle is substantially entirely provided by vehicle support means 71, 72, 73 and 74 schematically shown in FIG. 1 as coil springs.

The front left ram 1 comprises a piston 5 and rod 9 which are fixed together, or may be one piece. The piston 5 seals against the barrel 13 of the ram 1 using an O-ring, a PTFE band, a seal in a groove with a backing O-ring or any other known means (not shown). The piston 5 divides the barrel 13 into a first chamber 17 and a second chamber 21. The front right ram 2 is of similar construction, having a rod 10, a piston 6 forming a first chamber 18 and a second chamber 22 inside the barrel 14. Both of these double acting rams seal across the piston so that the volume of fluid in each first chamber does not mix with the volume of fluid in the second chamber (apart from any slight leakage which is almost inevitable with a running seal in use).

The back left ram 4 similarly has a rod 12, a piston 8 forming a first chamber 20 and a second chamber 24 inside the barrel 16. However, the piston 8 has one or more holes through it, as indicated at 26 so that the ram is effectively single-acting, with the rod diameter determining the effective area and therefore the volume of fluid displaced into or out of the ram with rod displacement. Indeed the piston may be omitted as described in more detail later, deleting the second chamber 24. The back right ram 3 is of a similar construction, having a rod 11, a piston 7 forming a first chamber 19 and a second chamber 23 inside the barrel 15, the piston including one or more holes through it as shown at 25 to interconnect the first chamber 19 and the second chamber 23. Again the piston, holes and second chamber may be deleted.

The first chamber 17 of the front left ram 1 is connected to the second chamber 22 of the front right ram 2 by a fluid conduit 27, and the first chamber 18 of the front right ram 2 is connected to the second chamber 21 of the front left ram 1 by a fluid conduit 28. An accumulator (31, 32) is provided on each of the front conduits 27 and 28. The accumulators shown are of the hydropneumatic type having a gas chamber (33, 34) and a fluid chamber (35, 36) separated by a diaphragm (37, 38). The fluid chamber 35 of accumulator 31 is in fluid communication with the fluid conduit 27 and the fluid chamber 36 of accumulator 32 is in fluid communication with the fluid conduit 28. The accumulators may be of any other known type, such as the piston type and use different spring means such as coil springs instead of gas. Although the pressure pre-charge in the system produces a push out force on the rods, the balance between the roll stiffness and front two wheel bounce stiffness can be tuned using the ratio of the diameter of the rods 9 and 10 to the diameter of the barrels 13 and 14.

The front conduits 27 and 28 are connected to the back rams 3 and 4 by longitudinal conduits 29 and 30 so the front and back rams are interconnected to provide roll stiffness without introducing a corresponding warp stiffness. The accumulators 31 and 32 can be used to provide the sole source of resilience in the system and may therefore be located anywhere on the front or longitudinal conduits or on any of the rams. To reduce fluid mass acceleration effects, the accumulators are usually placed on the front conduits as shown. Alternatively additional rear accumulators may be provided (not shown) or the resilience may be provided in part or even solely by expansion in flexible lines. The advantage of the arrangement shown with the accumulators providing the majority of resilience in the system is that this resilience can be damped. Damping the resilience in the system allows higher roll damping to be provided than the bounce damping due to the relative displacements from the double-acting rams in the roll and bounce modes. To this end, optional damper valves 47 and 48 are shown on the accumulators 31 and 32. These valves are preferably double-acting (ie damping fluid flow both into and out of the accumulators), but may be used in rebound only for example or in different magnitudes for compression and rebound. Damping at the accumulators (ie damping the primary source of resilience in the system) is especially valuable when using active roll control (ie a pump, valves, sensors, controller, etc) to compensate for the roll angle due to lateral acceleration when cornering. If the resilience in the accumulators is not damped, active control is much more difficult as the controller has to control an undamped spring.

The overall roll stiffness is produced by the displacement of the front pistons and rods and the rear rods. The front rams displace a fluid from an annular area and a whole barrel area into one accumulator and out of the other, and the rear rams displace only the rod area into or out of the accumulators. In heave (four wheel bounce) front and rear rod areas are displaced into the accumulators in compression and out of the accumulators in rebound.

Wheel damping can optionally be provided. The front compression damping can be performed by valves 39 and 40 on the first chambers of the rams 1 and 2. These damping valves are preferably integrated into the ram similar to the base valves in a conventional damper. Front rebound damping can be performed at the same point, but is then limited due to the fluid in the first chambers being able to cavitate and expand. It is therefore preferable to provide the front rebound damping at valves 41 and 42, which can be integrated into the ram, for example, actually in the annular area around the rod. Then the fluid is in compression in the second chambers 21 and 22 through the valve, preventing loss of damping at high speeds and forces. The back compression damping can be provided like the front compression damping by valves 43 and 44 in the end of the ram. The flow through these back compression damping valves is only caused by rod displacement, so can be low as conventionally used in vehicle tuning. The back rebound damping is preferably provided on the piston as shown at 45 and 46. The shims on the full face of the piston provide damping as the ram extends in FIG. 1. A replenishing disc (49 and 50) is also shown on the annular face of each piston to allow low restriction in compression and force fluid through the rebound damping as the ram extends. Additional compression damping can be provided in place of a simple replenishing disc, although this must be balanced with the compression damping at 43 and 44 to prevent cavitation and loss of damping. This is the same as a conventional damper or "shock absorber". All damping valves may include any of the known components for damping. For example: the holes through the piston can be used to control force at high speed flow; an initial slotted shim, stepped piston sealing land or orifice through the replenishing disc to control the force at low speed flow; a stack of shims of various diameters with a variable preload into the piston for control through the speed range; and coil spring or other spring type blow off to limit maximum damping force.

If no rear damping is required in the roll control system (it being provided by separate means, as may be the rebound stop) then the rear rams can be simpler single acting rams and may only be a rod displacing into a barrel, with no piston, second chamber, damping valving etc.

As the fluid in the system changes temperature with environmental and vehicle operating conditions, the resulting changes in fluid volume can be significant relative to the accumulator volume, causing large changes in the static operating pressure of the system, and therefore affecting changes in the system roll and bounce stiffnesses, ram push out force and even vehicle ride height. It can therefore be advantageous to provide a method regulating the static pressure in the system. This can be done using sensors, valves, a pump, etc., but is preferably done passively by using at least one additional accumulator. If sensors, valves, a pump, etc. are used then the system can be used to react offset loads (ie static roll moments due to uneven loading of the vehicle left to right).

If at least one additional accumulator is used, it is preferably of a type with a mechanical resilience, ie a coil spring accumulator as shown at 51 in FIG. 1, as the gas in hydropneumatic accumulators is sensitive to environmental temperature, although this type can also be used. The accumulator is connected to both fluid conduit system in the system by passages in a block, or by the lines 52 and 53 shown in FIG. 1. The passages or lines incorporate some form of restriction 54 and 55. This restriction may be of any known form including a valve. The ideal form of restriction is one which is relatively constant with changing fluid viscosity, but this type of restriction can be very expensive due to the tolerances required. Ideally filters are provided to prevent blockage of the restrictions. The restriction should be designed to limit flow between the systems in cornering, but allow enough flow to prevent temperature fluctuations causing significant changes in system stiffnesses. The size of accumulator required is dependent on the fluid volume in the systems and the range of operating temperatures required.

Figure 3:
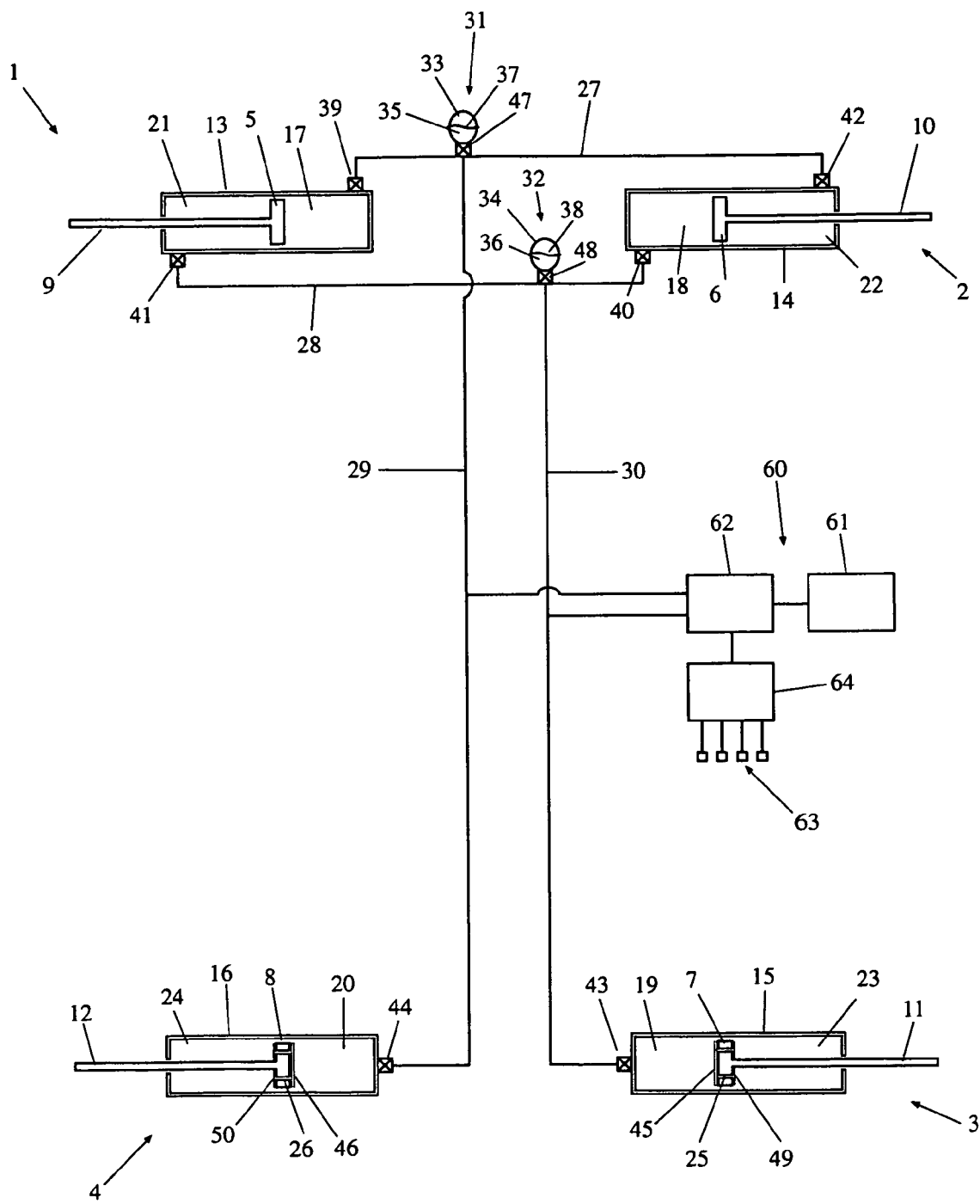
FIG. 3 is a schematic diagram of a modification to the roll control system of FIG. 1.

In FIG. 3, the passive pressure regulating components from FIG. 1 are replaced by a fluid supply system 60 which controls the pressure in the roll control system and it supplies and removes fluid from the first and second fluid systems. This system 60 can be used to regulate the static pressure in the system. The fluid supply system 60 includes a source of pressurized fluid 61, valves 62, sensors 63, and a control unit 64. The source of pressurized fluid 61 can include a fluid pump.

Modifications and variations as would be deemed obvious to the person skilled in the art are included within the ambit of the present invention as claimed in the appended claims.

The invention claimed is:

1. A roll control system for a vehicle comprising:
   two double-acting rams at the first end of the vehicle and two single acting rams at the second end of the vehicle;
   each double-acting ram including a first and a second fluid chamber;
   each single-acting ram including at least a first fluid chamber;
   a first lateral conduit providing fluid communication between the first fluid chamber of the double-acting ram on a first side of the vehicle and the second fluid chamber of the double-acting ram on a second side of the vehicle, a first longitudinal conduit providing fluid communication between the first fluid chamber of the single-acting ram on the first side of the vehicle and the first lateral conduit, the first lateral conduit and first longitudinal conduit forming a first fluid conduit system;
   a second lateral conduit providing fluid communication between the first fluid chamber of the double-acting ram on the second side of the vehicle and the second fluid chamber of the double-acting ram on the first side of the vehicle, a second longitudinal conduit providing fluid communication between the first fluid chamber of the single-acting ram on the second side of the vehicle and the second lateral conduit, the second lateral conduit and second longitudinal conduit forming a second fluid conduit system;

the roll control system providing little to no support for the vehicle and providing a roll stiffness with substantially no warp stiffness.

2. A roll control system according to claim 1, wherein at least one accumulator is provided on each of the first and second fluid conduit systems.

3. A roll control system according to claim 2, wherein each double-acting ram includes a barrel accommodating a piston fixed to a piston rod, the piston separating the interior of the barrel into said first and second chambers;

the piston including a seal to the barrel to substantially prevent transfer of fluid from the first chamber to the second chamber.

4. A roll control system according to claim 2, wherein accumulator dampers are provided between the accumulators and the first and second fluid conduit systems.

5. A roll control system according to claim 1, wherein each single acting ram may further include a piston fixed to the rod, the piston dividing the barrel into a first and a second fluid chamber.

6. A roll control system according to claim 5, wherein each piston includes holes through to permit fluid communication between the first and second fluid chambers.

7. A roll control system according to claim 1, wherein damper valves are provided to variably restrict the flow of fluid out of the first fluid chamber of each of the rams.

8. A roll control system according to claim 7, wherein damping valves are provided to variably restrict the flow of fluid out of the second fluid chamber of each of the rams.

9. A roll control system according to claim 1, further including at least one pressure maintenance accumulator, connected to both the first and second fluid conduit systems through restrictors.

10. A roll control system according to claim 1, further including at least one pressure maintenance accumulator, connected to both the first and second fluid conduit systems through a valve system controlled by a mechanical or electronic device.

11. A roll control system according to claim 1, further including a fluid supply system for controlling the pressure in the system and supplying and removing fluid from the first and second fluid conduit systems.

12. A roll control system according to claim 1, wherein damping valves are provided to variably restrict the flow of fluid out of the second fluid chamber of each of the rams.

13. A roll control system according to claim 1, wherein each double-acting ram includes a barrel accommodating a piston fixed to a piston rod, the piston separating the interior of the barrel into said first and second chambers;

the piston including a seal to the barrel to substantially prevent transfer of fluid from the first chamber to the second chamber.

14. A roll control system according to claim 1, wherein the first longitudinal conduit defines a first continuous fluid passage between the first fluid chamber of the single-acting ram on the first side of the vehicle and the first lateral conduit and the second longitudinal conduit defines a second continuous fluid passage between the first fluid chamber of the single-acting ram on the second side of the vehicle and the second lateral conduit.

* * * * *